United States Patent
Yao

(10) Patent No.: US 9,586,851 B2
(45) Date of Patent: Mar. 7, 2017

(54) METHOD FOR CUTTING SINGLE SHEET OF GLASS SUBSTRATE

(71) Applicant: Shenzhen China Star Optoelectronics Technology Co., Ltd., Shenzhen, Guangdong (CN)

(72) Inventor: Jiangbo Yao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 403 days.

(21) Appl. No.: 14/381,198

(22) PCT Filed: May 28, 2014

(86) PCT No.: PCT/CN2014/078675
§ 371 (c)(1),
(2) Date: Aug. 26, 2014

(87) PCT Pub. No.: WO2015/172408
PCT Pub. Date: Nov. 19, 2015

(65) Prior Publication Data
US 2016/0229732 A1    Aug. 11, 2016

(30) Foreign Application Priority Data
May 16, 2014   (CN) .......................... 2014 1 0209664

(51) Int. Cl.
   *C03B 33/10*       (2006.01)
   *B26D 7/18*        (2006.01)
   (Continued)

(52) U.S. Cl.
   CPC ............ *C03B 33/10* (2013.01); *B26D 7/1863* (2013.01); *C03B 33/023* (2013.01); *C03B 33/03* (2013.01);
   (Continued)

(58) Field of Classification Search
   CPC ..... C03B 33/10; C03B 33/105; C03B 33/023; C03B 33/03; B26D 7/1863; G02F 1/1303;
   (Continued)

(56) References Cited

U.S. PATENT DOCUMENTS 5,165,585 A * 11/1992 Lisec .................... C03B 33/033
                                                              225/105
5,873,922 A *  2/1999 Lisec .................. C03B 33/0207
                                                               65/105
(Continued)

FOREIGN PATENT DOCUMENTS

CN     102050564 A  * 11/2009
JP     2005067971 A *  3/2005

OTHER PUBLICATIONS

The State Intellectual Property Office of People's Republic of China, Application No. 201410209664.9, First Office Action.*

*Primary Examiner* — Jonathan Riley
(74) *Attorney, Agent, or Firm* — Andrew C. Cheng

(57) ABSTRACT

The present invention provides a method for cutting a single sheet of glass substrate, which includes the following steps: (1) providing a single sheet of glass substrate (10) to be cut and a cutting platform (20); (2) fixing the single sheet of glass substrate (10) on the cutting platform (20); (3) rotating the cutting platform (20) to have the single sheet of glass substrate (10) located under the cutting platform (20); (4) providing a cutting head (30) under the cutting platform (20) to proceed with a cutting operation on the single sheet of glass substrate (10) and also providing a vacuum suction device (40) and a static electricity elimination device (50) to remove glass chips generated by the cutting head (30) cutting the single sheet of glass substrate (10); and (5) after the cutting operation, moving the cutting platform (20) away from the cutting head (30), the vacuum suction device (40), and the static electricity elimination device (50) and rotating (Continued)

the cutting platform (20) to have the cut single sheet of glass substrate (10) located above the cutting platform.

11 Claims, 5 Drawing Sheets

(51) Int. Cl.
    *C03B 33/023*     (2006.01)
    *C03B 33/03*     (2006.01)
    *G02F 1/13*     (2006.01)
    *G02F 1/1333*     (2006.01)

(52) U.S. Cl.
    CPC .......... *C03B 33/105* (2013.01); *G02F 1/1303* (2013.01); *B65G 2249/04* (2013.01); *G02F 2001/133302* (2013.01); *Y02P 40/57* (2015.11)

(58) Field of Classification Search
    CPC ..... G02F 2001/133302; B65G 2249/04; Y02P 40/57; Y10T 83/0505; Y10T 83/051; Y10T 83/6667; Y10T 83/0453; Y10T 83/0443; Y10T 83/207; Y10T 83/364; Y10T 83/6472; Y10T 83/215; Y10T 83/222; Y10T 83/023; Y10T 83/0333; Y10T 83/0341; Y10T 83/0348; Y10T 83/0356; Y10T 83/0363; Y10T 225/10; Y10T 225/12
    USPC ...... 257/59, 72; 438/48, 128, 149, 151, 157, 438/283
    See application file for complete search history.

(56) References Cited

U.S. PATENT DOCUMENTS

| | | | | |
|---|---|---|---|---|
| 6,795,154 B2* | 9/2004 | Uh | .......... | B26F 3/002 349/158 |
| 2003/0147035 A1* | 8/2003 | Chae | .......... | B28D 5/0011 349/158 |
| 2004/0040997 A1* | 3/2004 | Ueyama | .......... | B28D 5/0011 225/96.5 |
| 2004/0074366 A1* | 4/2004 | Choo | .......... | C03B 33/03 83/886 |
| 2004/0245913 A1* | 12/2004 | Wakayama | .......... | B28D 5/0011 313/493 |
| 2005/0056127 A1* | 3/2005 | Yamabuchi | .......... | C03B 33/07 83/13 |
| 2006/0137504 A1* | 6/2006 | Nishio | .......... | B28D 1/226 83/875 |
| 2007/0063402 A1* | 3/2007 | Soyama | .......... | B25B 11/005 269/21 |
| 2007/0132935 A1* | 6/2007 | Mori | .......... | C03B 33/033 349/153 |
| 2008/0278880 A1* | 11/2008 | Kisakibaru | .......... | G02F 1/1303 361/213 |
| 2009/0078105 A1* | 3/2009 | Maekawa | .......... | B28D 1/225 83/886 |
| 2009/0084409 A1* | 4/2009 | Okura | .......... | B08B 3/02 134/21 |
| 2012/0006175 A1* | 1/2012 | Bando | .......... | B28D 1/226 83/880 |
| 2012/0210842 A1* | 8/2012 | Brackley | .......... | C03B 33/0215 83/880 |
| 2015/0299021 A1* | 10/2015 | Itoh | .......... | C03B 33/0235 83/880 |

* cited by examiner

METHOD FOR CUTTING SINGLE SHEET OF GLASS SUBSTRATE

BACKGROUND OF THE INVENTION

1. Field of the Invention

The present invention relates to the field of manufacture of liquid crystal displays, and in particular to a method for cutting a single sheet of glass substrate.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a thin-film transistor (TFT) array substrate, a color filter (CF) substrate, and a liquid crystal layer arranged between the two substrates and the principle of operation is that a driving voltage is applied to the two glass substrates to control the rotation of the liquid crystal molecules of the liquid crystal layer in order to refract out light emitting from the backlight module to generate images.

A TFT substrate comprises a glass substrate and a TFT array formed on the glass substrate. The TFT array drives the liquid crystal molecules of the liquid crystal layer to rotate in order to perform selection of light with the liquid crystal panel. Thus, the TFT substrate is an important constituent component of a liquid crystal display device and has direct influence on the displaying quality of the liquid crystal panel.

In the manufacture of the liquid crystal panel, a single sheet of glass substrate is arranged to form a plurality of TFT substrates. Thus, it is necessary to cut the single sheet glass substrate into a plurality of individual TFT substrates. Heretofore, a method that is applied to cutting a single sheet glass substrate is as follows. The single sheet of glass substrate is placed under a cutting head to allow the cutting head to directly cut the single sheet of glass substrate along predetermined cutting paths. Such a method suffers certain drawbacks, which are generally caused by glass chips generated in a process that the cutting head cuts the single sheet of glass substrate and flying chaotically away to circuit patterns of the TFTs formed on the single sheet of glass substrate and attached to the circuit patterns of the TFTs due to electrostatics, making it impossible to be completed cleared off and leading to flaw products and affecting the displaying quality of the liquid crystal panel.

SUMMARY OF THE INVENTION

An object of the present invention is to provide a method for cutting a single sheet of glass substrate, wherein with such a method, glass chips generated during a cutting process can be completely eliminated so as to effectively overcome the issue of flaw product resulting from glass chips flying away and attached to TFT circuits thereby improving the quality of a liquid crystal panel and a liquid crystal display device and enhancing yield rate of products.

To achieve the above object, the present invention provides a method for cutting a single sheet of glass substrate, comprising the following steps:

(1) providing a single sheet of glass substrate to be cut and a cutting platform;

(2) fixing the single sheet of glass substrate on the cutting platform;

(3) rotating the cutting platform to have the single sheet of glass substrate located under the cutting platform;

(4) providing a cutting head under the cutting platform to proceed with a cutting operation on the single sheet of glass substrate and also providing a vacuum suction device and a static electricity elimination device to remove glass chips generated by the cutting head cutting the single sheet of glass substrate; and (5) after the cutting operation, moving the cutting platform away from the cutting head, the vacuum suction device, and the static electricity elimination device and rotating the cutting platform to have the cut single sheet of glass substrate located above the cutting platform.

In Step 2, vacuum suction and clips are applied to fix the single sheet of glass substrate on the cutting platform.

In Step 2, the vacuum suction is applied to a surface of the single sheet of glass substrate that is in contact with the cutting platform and the clips are used to fix edges of the single sheet of glass substrate.

In Step 3, an electrical motor is operated to drive belt transmission mechanism to rotate the cutting platform.

The cutting platform has opposite sides each of which is provided with one of the belt transmission mechanisms. Each of the belt transmission mechanisms comprises a pulley mounted to the cutting platform, a driving roller driven by the electrical motor, and a transmission belt mounted between the pulley and the driving roller.

In Step 3, the cutting platform is rotated by 180 degrees.

In Step 4, the cutting platform is moved to have the single sheet of glass substrate contact and press against the cutting head; the vacuum suction device and the static electricity elimination device are activated; and simultaneously, the cutting head is activated to proceed with the cutting operation.

The cutting head comprises a pressure transducer and in Step 4, when the cutting platform is moved to have the single sheet of glass substrate contact and press against the cutting head, the pressure transducer detects a pressure and activates the vacuum suction device and the static electricity elimination device and simultaneously activate the cutting head to proceed with the cutting operation.

The cutting head, the vacuum suction device, and the static electricity elimination device are mounted inside a mounting hood.

The static electricity elimination device applies X-ray to remove static electricity.

The present invention also provides a method for cutting a single sheet of glass substrate, which comprises the following steps:

(1) providing a single sheet of glass substrate to be cut and a cutting platform;

(2) fixing the single sheet of glass substrate on the cutting platform;

(3) rotating the cutting platform to have the single sheet of glass substrate located under the cutting platform;

(4) providing a cutting head under the cutting platform to proceed with a cutting operation on the single sheet of glass substrate and also providing a vacuum suction device and a static electricity elimination device to remove glass chips generated by the cutting head cutting the single sheet of glass substrate; and (5) after the cutting operation, moving the cutting platform away from the cutting head, the vacuum suction device, and the static electricity elimination device and rotating the cutting platform to have the cut single sheet of glass substrate located above the cutting platform;

wherein in Step 2, vacuum suction and clips are applied to fix the single sheet of glass substrate on the cutting platform;

wherein in Step 2, the vacuum suction is applied to a surface of the single sheet of glass substrate that is in contact with the cutting platform and the clips are used to fix edges of the single sheet of glass substrate;

wherein in Step 3, an electrical motor is operated to drive belt transmission mechanism to rotate the cutting platform;

wherein the cutting platform has opposite sides each of which is provided with one of the belt transmission mechanisms, each of the belt transmission mechanisms comprising a pulley mounted to the cutting platform, a driving roller driven by the electrical motor, and a transmission belt mounted between the pulley and the driving roller;

wherein in Step 3, the cutting platform is rotated by 180 degrees;

wherein in Step 4, the cutting platform is moved to have the single sheet of glass substrate contact and press against the cutting head; the vacuum suction device and the static electricity elimination device are activated; and simultaneously, the cutting head is activated to proceed with the cutting operation;

wherein the cutting head comprises a pressure transducer and in Step 4, when the cutting platform is moved to have the single sheet of glass substrate contact and press against the cutting head, the pressure transducer detects a pressure and activates the vacuum suction device and the static electricity elimination device and simultaneously activate the cutting head to proceed with the cutting operation;

wherein the cutting head, the vacuum suction device, and the static electricity elimination device are mounted inside a mounting hood; and wherein the static electricity elimination device applies X-ray to remove static electricity.

The efficacy of the present invention is that the present invention provides a method for cutting a single sheet of glass substrate, wherein in a cutting operation, the cutting head is located under a cutting platform and a single sheet of glass substrate and simultaneously, a vacuum suction device and a static electricity elimination device are operated to completely suck and eliminate the glass chips generated in the operation thereby effectively overcoming the issue of flow products resulting from glass chips flying away and attached to circuits of thin-film transistors so as to improve the quality of a liquid crystal panel and a liquid crystal display device and to enhance product yield rate.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

Figure 1:
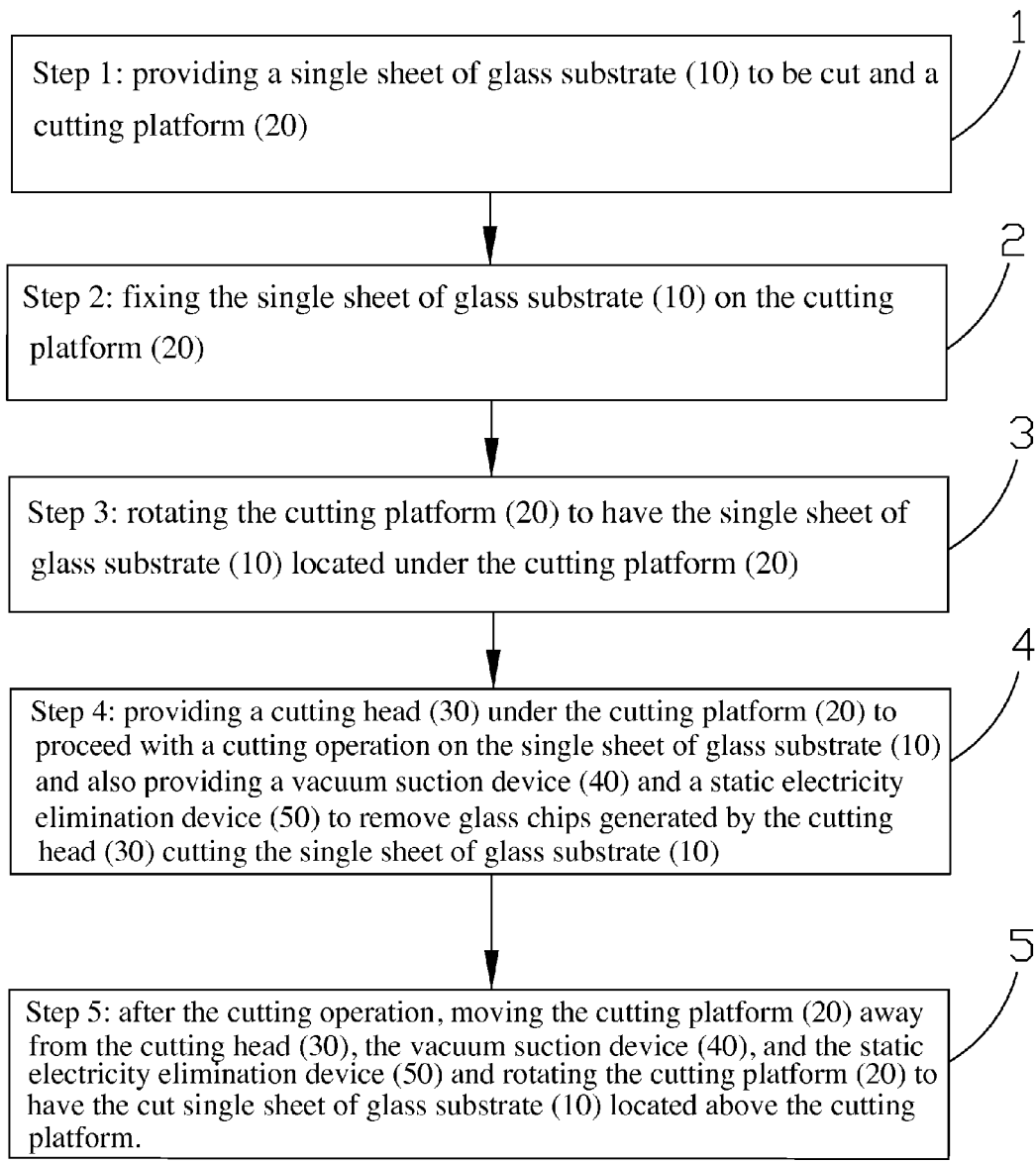
FIG. 1 is a flow chart illustrating a method for cutting a single sheet of glass substrate according to the present invention.

To further expound the technical solution adopted in the present invention and the advantages thereof, a detailed description is given to a preferred embodiment of the present invention and the attached drawings.

Referring to FIGS. 1-8, the present invention provides a method for cutting a single sheet of glass substrate, which comprises the following steps:

Step 1: providing a single sheet of glass substrate 10 to be cut and a cutting platform 20;

Step 2: fixing the single sheet of glass substrate 10 on the cutting platform 20;

Step 3: rotating the cutting platform 20 to have the single sheet of glass substrate 10 located under the cutting platform 20;

Step 4: providing a cutting head 30 under the cutting platform 20 to proceed with a cutting operation on the single sheet of glass substrate 10 and also providing a vacuum suction device 40 and a static electricity elimination device 50 to remove glass chips generated by the cutting head 30 cutting the single sheet of glass substrate 10; and Step 5: after the cutting operation, moving the cutting platform 20 away from the cutting head 30, the vacuum suction device 40, and the static electricity elimination device 50 and rotating the cutting platform 20 to have the cut single sheet of glass substrate 10 located above the cutting platform 20.

Figure 2:
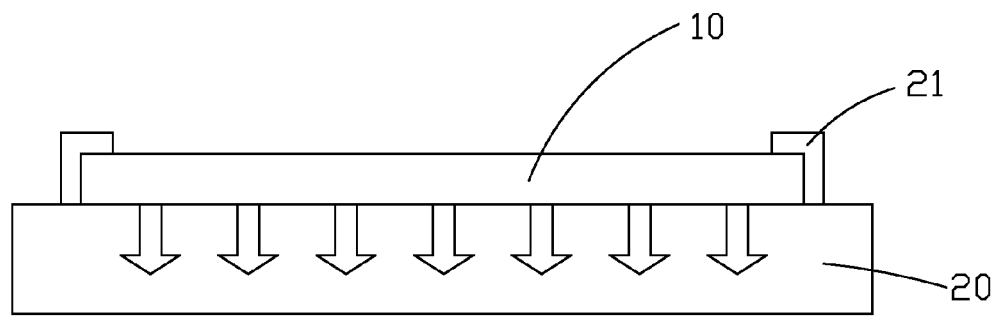
FIG. 2 is a simplified schematic view illustrating step (2) of the method for cutting a single sheet of glass substrate according to the present invention.
Figure 3:
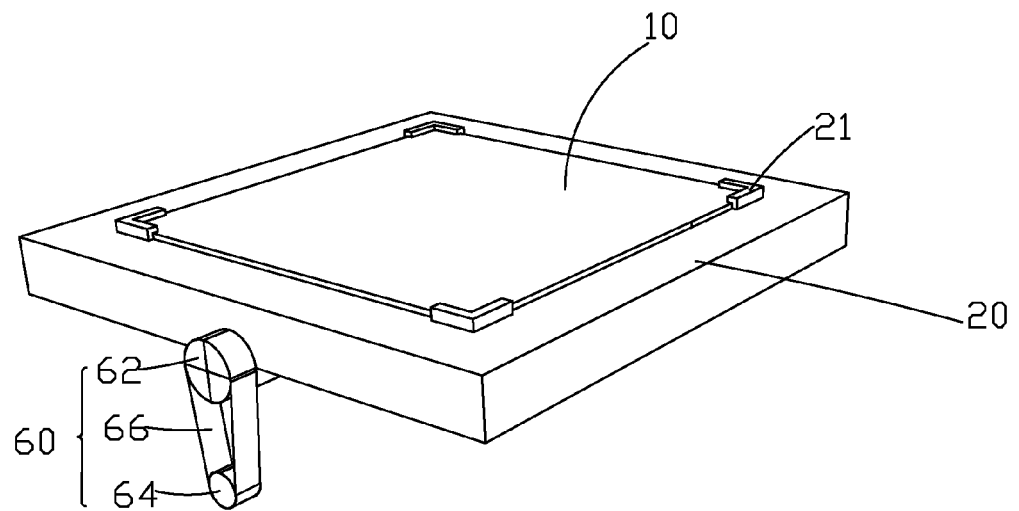
FIG. 3 is a perspective view illustrating step (2) of the method for cutting a single sheet of glass substrate according to the present invention.

Specifically, referring to FIGS. 2 and 3, the cutting platform 20 of Step 2 comprises vacuum suction units arranged therein to apply a suction force to hold the single sheet of glass substrate 10. Further, clips 21 are provided on the cutting platform 20 in order to further fix, from edges of the single sheet of glass substrate 10, the single sheet of glass substrate 10 to the cutting platform 20. Preferably, the number of the clips 21 used is four. The single sheet of glass substrate 10 is placed on the cutting platform 20 and vacuum suction is applied to hold a surface of the single sheet of glass substrate 10 that is in contact engagement with the cutting platform 20. Meanwhile, the clips 21 are used to position and tightly hold the edges of the single sheet of glass substrate 10 down to the cutting platform 20 to achieve fixing of the single sheet of glass substrate 10 to the cutting platform 20 with a secure and reliable effect of fixing.

Figure 4:
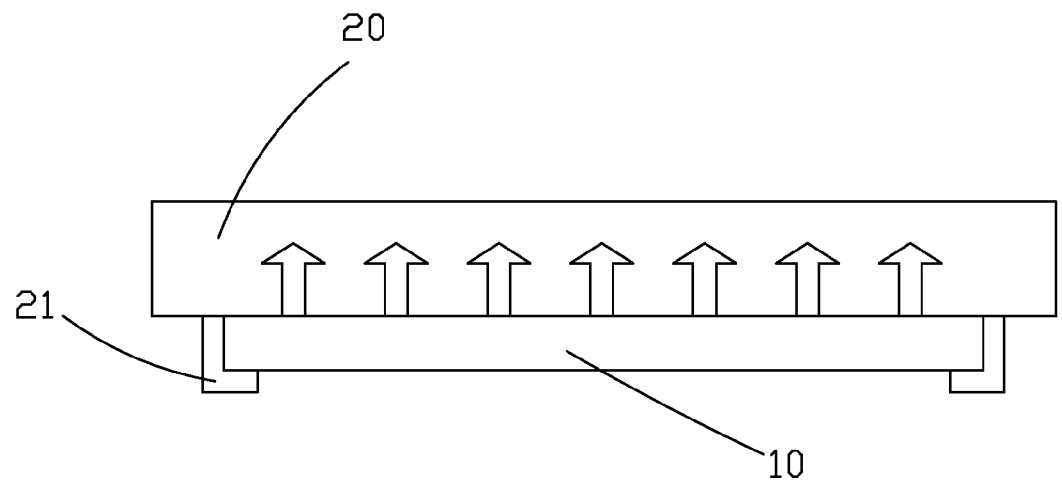
FIG. 4 is a simplified schematic view illustrating step (3) of the method for cutting a single sheet of glass substrate according to the present invention.
Figure 5:
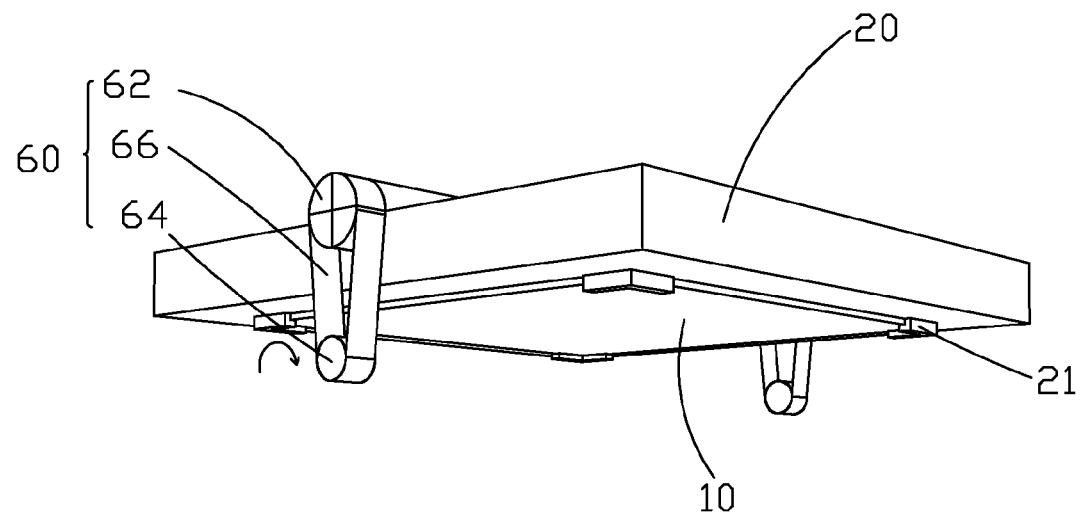
FIG. 5 is a perspective view illustrating step (3) of the method for cutting a single sheet of glass substrate according to the present invention.

Referring to FIGS. 4 and 5, in Step 3, an electrical motor is applied to drive belt transmission mechanisms 60 for rotating the cutting platform 20. Further, the cutting platform 20 has opposite sides each of which is provided with one belt transmission mechanism 60. Each of the belt transmission mechanisms 60 comprises a pulley 62 mounted to the cutting platform 20, a driving roller 64 driven by the electrical motor, and a transmission belt 66 mounted between the pulley 62 and the driving roller 64. A specific way of carrying out Step 3 is that the electrical motor is activated to allow the electrical motor to drive the driving rollers 64 to rotate and the driving rollers 64 drive, via the transmission belts 66, the pulleys 62 to rotate, so that the cutting platform 20 is caused to rotate under the action of the pulleys 62 on the two sides thereof. Preferably, the cutting platform is rotated by 180 degrees to have the single sheet of glass substrate 10 that is fixed to the cutting platform 20 become located under the cutting platform 20. After the completion of the 180-degree rotation of the cutting platform 20, the electrical motor is de-activated to keep the cutting platform 20 and the single sheet of glass substrate 10 in such positions.

Figure 6:
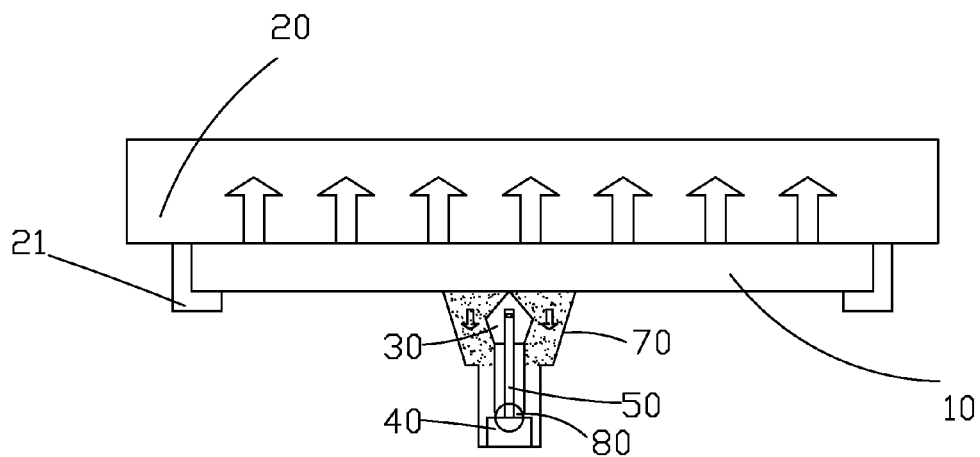
FIG. 6 is a simplified schematic view illustrating step (4) of the method for cutting a single sheet of glass substrate according to the present invention.
Figure 7:
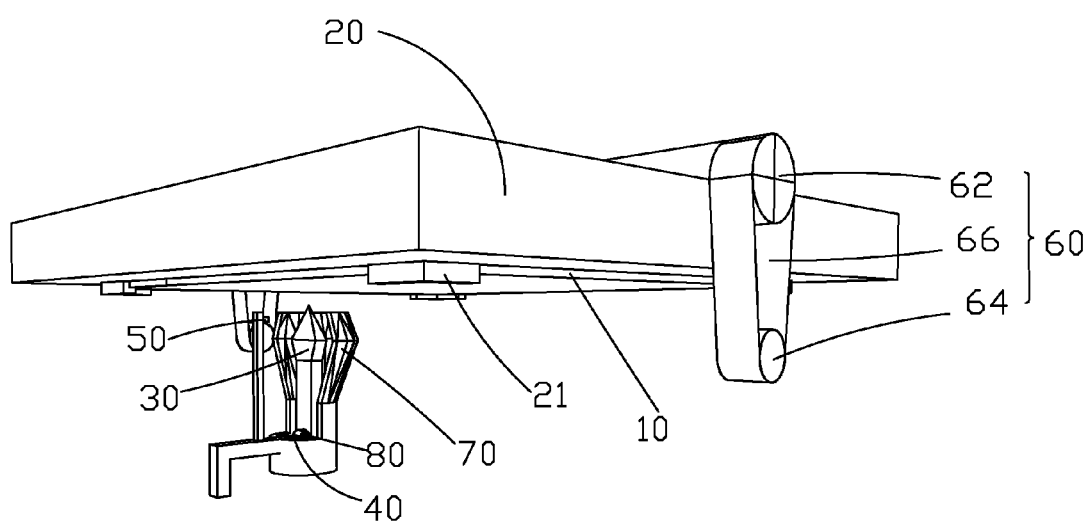
FIG. 7 is a perspective view illustrating step (4) of the method for cutting a single sheet of glass substrate according to the present invention.
Figure 8:
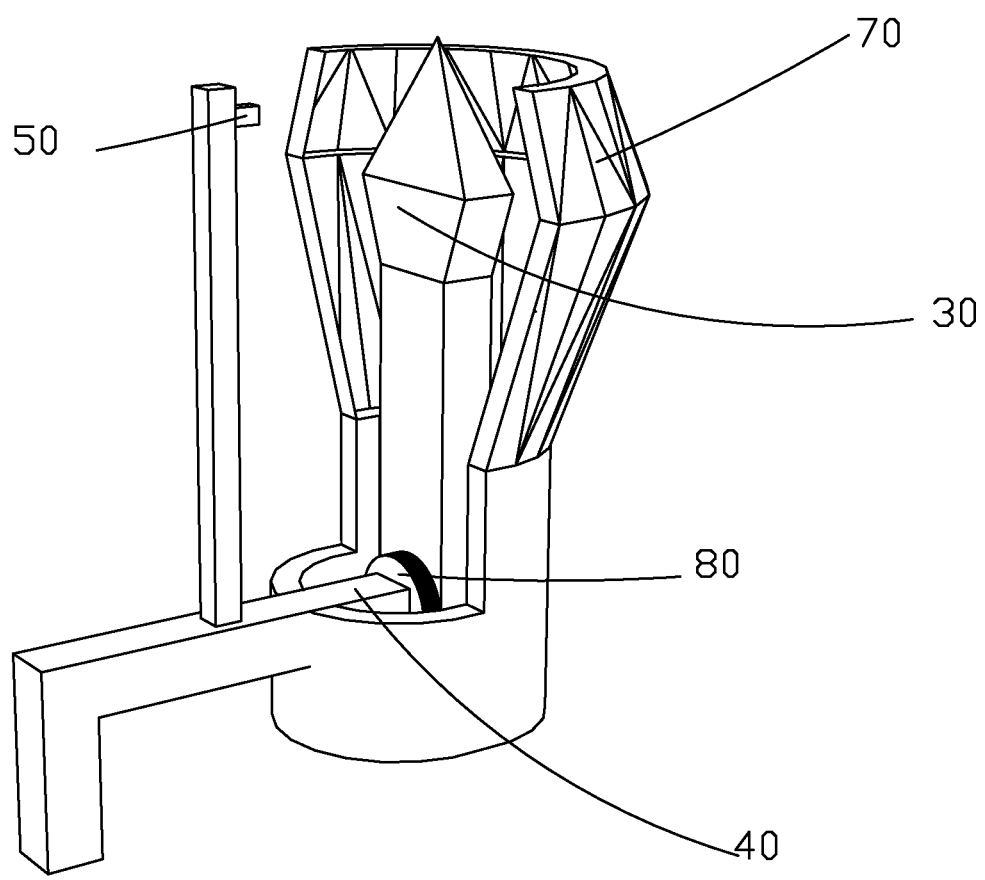
FIG. 8 is a perspective view, in an enlarged form, showing a cutting head, a vacuum suction device, and a static electricity elimination device used in step (4) of the method for cutting a single sheet of glass substrate according to the present invention.

Referring to FIGS. 6, 7, and 8, in Step 4, the cutting head 30, the vacuum suction device 40, and the static electricity elimination device 50 are mounted inside a mounting hood 70. The cutting head 30 has a stem to which a pressure transducer 80 is mounted. The pressure transducer 80 is electrically connected to a control circuit module. The control circuit module is electrically connected to the cutting head 30, the vacuum suction device 40, and the static electricity elimination device 50. The static electricity elimination device 50 may use X-ray to eliminate static electricity. A specific way of carrying out Step 4 is that the cutting platform 20 is moved to have the single sheet of glass substrate 10 contact and press against the cutting head 30 so that the pressure transducer 80 detects a pressure and feeds a signal back to the control circuit module. The control circuit module controls the vacuum suction device 40 and the static electricity elimination device 50 to activate and also activates the cutting head 30 to proceed with a cutting operation. During the cutting operation, glass chips are generated and are sucked by the vacuum suction device 40 to stay inside the mounting hood 70.

Simultaneously, the static electricity elimination device 50 emits X-ray to eliminate the static electricity. The glass chips are hard to attach to the single sheet of glass substrate 10, so that the elimination of the glass chips by the vacuum suction device 40 can be more thoroughly with the glass chips being completely sucked and held, thereby ensuring no attachment of glass chips to circuit patterns of thin-film transistors and thus improving the yield rate of products and enhancing product quality.

After the cutting of the single sheet of glass substrate 10 and the elimination of the glass chips have been completed in Step 4, Step 5 is performed to move the cutting platform 10 away from the cutting head 30, the vacuum suction device 40, and the static electricity elimination device 50 and to activate again the electrical motor to allow the driving rollers 64 to drive, via the transmission belts 66, the pulleys 62 to rotate so that the cutting platform 20 is caused by the pulleys 62 on the two sides thereof to rotate by 180 degrees and back to the position of Step 2. Namely, the single sheet of glass substrate 10 of the cutting is completed is located above the cutting platform 20, allowing for easy release of the clips for removal of the cutting-completed single sheet of glass substrate 10.

In summary, the present invention provides a method for cutting a single sheet of glass substrate, wherein in a cutting operation, the cutting head is located under a cutting platform and a single sheet of glass substrate and simultaneously, a vacuum suction device and a static electricity elimination device are operated to completely suck and eliminate the glass chips generated in the operation thereby effectively overcoming the issue of flow products resulting from glass chips flying away and attached to circuits of thin-film transistors so as to improve the quality of a liquid crystal panel and a liquid crystal display device and to enhance product yield rate.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for cutting a single sheet of glass substrate, comprising the following steps:
   (1) providing a single sheet of glass substrate to be cut and a cutting platform;
   (2) fixing the single sheet of glass substrate on the cutting platform;
   (3) rotating the cutting platform to have the single sheet of glass substrate located under the cutting platform;
   (4) providing a cutting head under the cutting platform to proceed with a cutting operation on the single sheet of glass substrate and also providing a vacuum suction device and a static electricity elimination device to remove glass chips generated by the cutting head cutting the single sheet of glass substrate; and
   (5) after the cutting operation, moving the cutting platform away from the cutting head, the vacuum suction device, and the static electricity elimination device and rotating the cutting platform to have the cut single sheet of glass substrate located above the cutting platform.

2. The method for cutting a single sheet of glass substrate as claimed in claim 1, wherein in Step 2, vacuum suction and clips are applied to fix the single sheet of glass substrate on the cutting platform.

3. The method for cutting a single sheet of glass substrate as claimed in claim 2, wherein in Step 2, the vacuum suction is applied to a surface of the single sheet of glass substrate that is in contact with the cutting platform and the clips are used to fix edges of the single sheet of glass substrate.

4. The method for cutting a single sheet of glass substrate as claimed in claim 1, wherein in Step 3, an electrical motor is operated to drive belt transmission mechanism to rotate the cutting platform.

5. The method for cutting a single sheet of glass substrate as claimed in claim 4, wherein the cutting platform has opposite sides each of which is provided with one of the belt transmission mechanisms, each of the belt transmission mechanisms comprising a pulley mounted to the cutting platform, a driving roller driven by the electrical motor, and a transmission belt mounted between the pulley and the driving roller.

6. The method for cutting a single sheet of glass substrate as claimed in claim 4, wherein in Step 3, the cutting platform is rotated by 180 degrees.

7. The method for cutting a single sheet of glass substrate as claimed in claim 1, wherein in Step 4, the cutting platform is moved to have the single sheet of glass substrate contact and press against the cutting head; the vacuum suction device and the static electricity elimination device are activated; and simultaneously, the cutting head is activated to proceed with the cutting operation.

8. The method for cutting a single sheet of glass substrate as claimed in claim 7, wherein the cutting head comprises a pressure transducer and in Step 4, when the cutting platform is moved to have the single sheet of glass substrate contact and press against the cutting head, the pressure transducer detects a pressure and activates the vacuum suction device and the static electricity elimination device and simultaneously activate the cutting head to proceed with the cutting operation.

9. The method for cutting a single sheet of glass substrate as claimed in claim 7, wherein the cutting head, the vacuum suction device, and the static electricity elimination device are mounted inside a mounting hood.

10. The method for cutting a single sheet of glass substrate as claimed in claim 7, wherein the static electricity elimination device applies X-ray to remove static electricity.

11. A method for cutting a single sheet of glass substrate, comprising the following steps:
   (1) providing a single sheet of glass substrate to be cut and a cutting platform;
   (2) fixing the single sheet of glass substrate on the cutting platform;
   (3) rotating the cutting platform to have the single sheet of glass substrate located under the cutting platform;
   (4) providing a cutting head under the cutting platform to proceed with a cutting operation on the single sheet of glass substrate and also providing a vacuum suction device and a static electricity elimination device to remove glass chips generated by the cutting head cutting the single sheet of glass substrate; and
   (5) after the cutting operation, moving the cutting platform away from the cutting head, the vacuum suction device, and the static electricity elimination device and rotating the cutting platform to have the cut single sheet of glass substrate located above the cutting platform;

wherein in Step 2, vacuum suction and clips are applied to fix the single sheet of glass substrate on the cutting platform;

wherein in Step 2, the vacuum suction is applied to a surface of the single sheet of glass substrate that is in contact with the cutting platform and the clips are used to fix edges of the single sheet of glass substrate;

wherein in Step 3, an electrical motor is operated to drive belt transmission mechanism to rotate the cutting platform;

wherein the cutting platform has opposite sides each of which is provided with one of the belt transmission mechanisms, each of the belt transmission mechanisms comprising a pulley mounted to the cutting platform, a driving roller driven by the electrical motor, and a transmission belt mounted between the pulley and the driving roller;

wherein in Step 3, the cutting platform is rotated by 180 degrees;

wherein in Step 4, the cutting platform is moved to have the single sheet of glass substrate contact and press against the cutting head; the vacuum suction device and the static electricity elimination device are activated; and simultaneously, the cutting head is activated to proceed with the cutting operation;

wherein the cutting head comprises a pressure transducer and in Step 4, when the cutting platform is moved to have the single sheet of glass substrate contact and press against the cutting head, the pressure transducer detects a pressure and activates the vacuum suction device and the static electricity elimination device and simultaneously activate the cutting head to proceed with the cutting operation;

wherein the cutting head, the vacuum suction device, and the static electricity elimination device are mounted inside a mounting hood; and wherein the static electricity elimination device applies X-ray to remove static electricity.

* * * * *